United States Patent
Ross

(10) Patent No.: US 9,695,796 B1
(45) Date of Patent: Jul. 4, 2017

(54) PARALLELOGRAM WAVE ENERGY COLLECTOR

(71) Applicant: Gary Ross, Oxnard, CA (US)

(72) Inventor: Gary Ross, Oxnard, CA (US)

(*) Notice: Subject to any disclaimer, the term of this patent is extended or adjusted under 35 U.S.C. 154(b) by 0 days.

(21) Appl. No.: 14/852,468

(22) Filed: Sep. 11, 2015

Related U.S. Application Data

(60) Provisional application No. 62/050,104, filed on Sep. 13, 2014.

(51) Int. Cl.
| | | |
|---|---|---|
| F03B 13/20 | (2006.01) | |
| F03B 13/18 | (2006.01) | |
| F03B 13/16 | (2006.01) | |
| F03B 13/14 | (2006.01) | |
| F03B 13/24 | (2006.01) | |
| E02B 9/08 | (2006.01) | |
| F03B 13/22 | (2006.01) | |

(52) U.S. Cl.
CPC .............. *F03B 13/188* (2013.01); *E02B 9/08* (2013.01); *F03B 13/14* (2013.01); *F03B 13/16* (2013.01); *F03B 13/182* (2013.01); *F03B 13/187* (2013.01); *F03B 13/1815* (2013.01); *F03B 13/1845* (2013.01); *F03B 13/1855* (2013.01); *F03B 13/20* (2013.01); *F03B 13/22* (2013.01); *F03B 13/24* (2013.01); *F05B 2240/40* (2013.01); *F05B 2240/93* (2013.01); *Y02E 10/28* (2013.01); *Y02E 10/38* (2013.01)

(58) Field of Classification Search
CPC ......... Y02E 10/38; Y02E 10/28; F03B 13/20; F03B 13/1815; F03B 13/1845; F03B 13/187; F03B 13/1855; F03B 13/16; F03B 13/188; F03B 13/182; F03B 13/14; F03B 13/24; F05B 2240/40; F05B 2240/93; E02B 9/08
See application file for complete search history.

(56) References Cited

U.S. PATENT DOCUMENTS

| | | | |
|---|---|---|---|
| 3,961,863 A * | 6/1976 | Hooper, III | ........... F03B 13/188 290/42 |
| 5,207,531 A | 5/1993 | Ross | |
| 8,974,192 B2 | 3/2015 | Ross | |
| 2006/0202483 A1* | 9/2006 | Gonzalez | ............ F03B 13/1845 290/53 |
| 2009/0025382 A1* | 1/2009 | Raikamo et al. | ..... F03B 13/181 60/495 |
| 2011/0163547 A1* | 7/2011 | Frishberg | ............ F03B 13/1815 290/53 |

* cited by examiner

*Primary Examiner* — Mark Laurenzi
*Assistant Examiner* — Wesley Harris
(74) *Attorney, Agent, or Firm* — Thomas I. Rozsa

(57) ABSTRACT

The present invention is a kinetic inshore wave energy conversion (WEC) device which uses the force of the wave to convert ocean water to pressurized water to eventually push on the blades of a turbine on shore to generate electrical energy. The WEC structure is affixed to a pipe reef structure with these pipes filled with water, submerged in the ocean and anchored to the ocean floor by a multiplicity of anchors. The dedicated pipes can run from any distance and extend all the way up to and underneath the shoreline and into a structure on shore which retains the turbine to convert the head pressure of the sea water to energy.

3 Claims, 15 Drawing Sheets

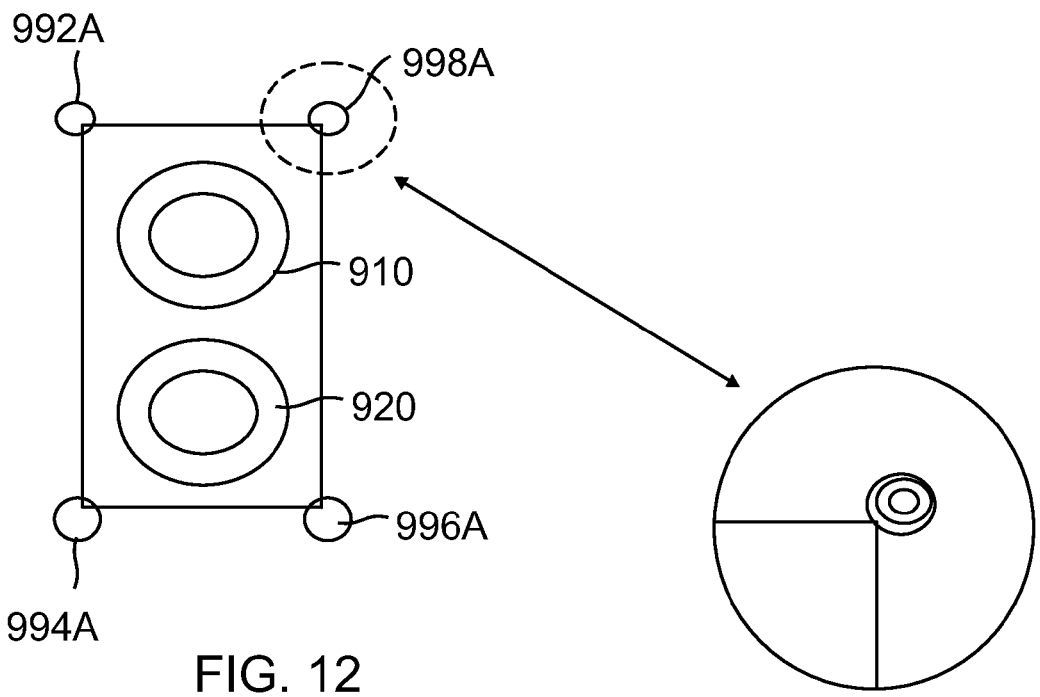
FIG. 12
FIG. 13
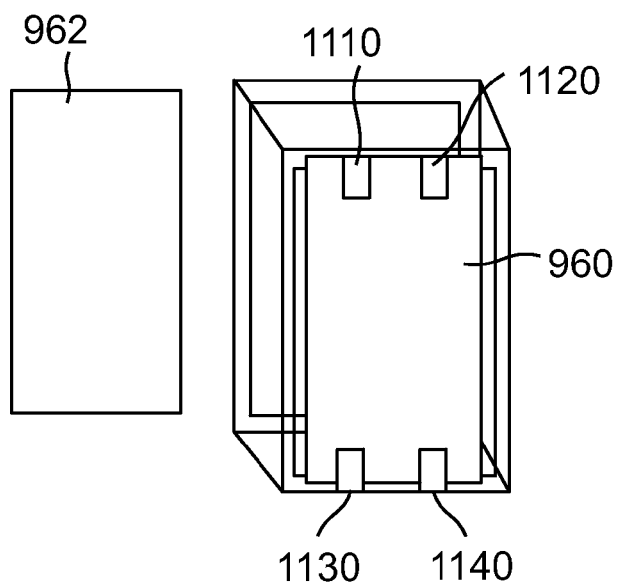
FIG. 14

PARALLELOGRAM WAVE ENERGY COLLECTOR

CROSS-REFERENCE TO RELATED APPLICATION

This patent application claims priority to Provisional Application No. 65/050,104 filed on Sep. 13, 2014, now pending.

BACKGROUND OF THE INVENTION

1. Field of the Invention

The present invention relates to the field of generating energy utilizing water as a force to create energy which is used to facilitate the generation of power.

2. Description of the Prior Art

The present inventor is also the inventor of U.S. Pat. No. 8,974,192 issued on Mar. 10, 2015 for the invention entitled "BIOMORPHIC WAVE ENERGY COLLECTOR".

SUMMARY OF THE INVENTION

The present invention utilizes the kinetic energy of waves through said invention to capture, push, and pressurize water to shore to convert with water turbines to generate electrical energy.

The present invention relates to generation of energy with a simple pump using the hydrodynamics of wave motion to act on a parallelogram compression mechanism with a flexible bladder between its walls. The force on the mechanism from two directions (towards the shore and away from the shore) impacts force on the mechanism to fill the bladder and compress to push sea water to shore. This process is managed with check valves to direct the pressurized sea water to shore through pipes where a turbine is used for conversion to hydropower.

The present invention is a parallelogram structure which is affixed to a shoaling reef structure and constructed of pipes. These pipes could be constructed of many different types of plastics including polyvinyl chloride, polyethylene, polypropylene, polycarbonate and thermoplastic polymers. The preferred material wold be High Density Polyethylene (HDPE). The multiplicity of pipes can be filled with air for deployment or filled with water and which are submerged in the ocean and affixed to the ocean floor by a multiplicity of anchors. A colony of parallelogram wave energy collectors (WEC) can be secured on the pipe body of the reef while floating in a harbor and then the reef can be towed and eventually anchored to the bottom of the ocean floor just off shore of any beach. The multiplicity of pipes any of which can also be used as pluming pipes.

The reef designed to cause wave shoaling and can be any size to fit a wave climate for any area. The dedicated plumbing pipes can run from any distance and extend all the way up to and underneath the shoreline and into a structure on shore which retains the turbine to convert the head pressure of the sea water to energy. The pipes of the offshore reef will vary according to the local wave climate of any area but will be approximately 300 feet in length. The power converting turbines could be a number of different hydropower turbines such as a Pelton turbine.

The present invention utilizes the concept of a parallelogram device which can be rotated in one direction such as away from the shore and then in an opposite direction toward the shore, to build up water in a diaphragm through one-way water entrance valves which fills the diaphragm with water and which through the lower one-way valves causes the water under pressure to exit a compressed diaphragm and to enter a multiplicity of pipes. The water is forced out through lower one-way check valves which in turn are connected to the plumbing pipes. Flowing water is directed onto the blades of a turbine runner, creating a force on the blades. This converts the force of water from the longitudinal pipes to useable energy.

Prior to hitting the turbine blades, the water's pressure (potential energy) is converted to kinetic energy by a nozzle and focused on the turbine. Water turbines are generally considered clean power producers, as the turbine causes essentially no change to the water. They use a renewable energy source and are designed to operate for decades. They produce significant amounts of the world's electrical supply.

The present invention is a unique source of generating high pressure water from the ocean to drive a water turbine to generate electrical energy.

The present invention utilizes the concept of having a parallelogram structure which houses a compressible diaphragm which has at least one or more one-way intake valves which are inserted into the top of the inflatable diaphragm and at least one or more one-way exit valves inserted into the bottom of the diaphragm, which bottom one-way valves are connected through a fluid connection into one or more of the pipes which transmit the water under pressure to the water turbine.

The present invention is submerged in water and anchored to the center of the reef, which is the highest elevation and away from the sand intrusion issues at the bottom. This also positions the parallelogram structure closer to the surface in order to take advantage of the higher energy in that part of the inshore water column. The parallelogram wave energy collector includes the diaphragm which is sandwiched between a pair of plates which in turn are affixed to hinges of the parallelogram. This enables the walls to compress in one direction and then in an opposite direction by the force of water hitting the plates and causing the plates and diaphragm to compress in a given direction. The force causes the diaphragm to be compressed, generating water under pressure which then fills the pipes. The pipes initially are filled with water and are sealed at their ends which are facing away from the shore and have an open end which extends into the structure where the water turbine is located. All of the one-way check valves are structured to be respectively above or below the location of the plates.

As the parallelogram wave energy collector is caused to move in one direction or another, the plates are rotated to a position where they are almost flat. Compressing the diaphragm generates pressurized water which is then fed into the longitudinal pipes. This pressurized water then passes through these longitudinal pipes to the water turbine to enable the water turbine blades to be rotated to generate electrical energy. The water turbine is one example of a device used to generate power from the force of water.

It is therefore an object of the present invention to create a parallelogram structure which can be rotated in one direction and in an opposite direction by the force of the ocean's water moving toward the shore and then receding from the shore. The force of the ocean's water enables a diaphragm filled with water to be compressed to send compressed fluid into receiving pipes which are filled with water and have the water under pressure strike the blades of a water turbine to create electrical energy.

The present invention envisions having a multiplicity of parallelogram structures at spaced apart locations along the length of the feed pipes so that the feed pipes are continuously filled with water under pressure to generate pressurized water to hit the blades of the water turbine.

The selected number of water feed pipes can vary. There should be at least two such lengthwise water feed pipes and any number beyond that. There is no specific length that is required for the water feed pipes but they must be of sufficient length to extend from the location where the parallelogram water energy collector is anchored to the location of the water turbine or other source of power generation which is impacted by the force of water.

It is an object of the present invention to create a source of pressurized water to push the blades of a turbine. Alternatively, the head pressure can be directed to a hill top reservoir or water tanks and another pipe running from that source to the turbines. The common hydrodynamic conversion is proven common for energy needs in rivers and with dams and it can also be used to convert the kinetic energy of waves to useable electricity in an environmentally friendly manner.

Any ocean area is affected by tides which play a significant role in the present invention. The tides are affected by natural forces occurring from the rotation of the earth, and also the effect of the moon directly responsible for the way tides go in and out in different locations of the earth. Gravity also plays a role in the way the tides are caused to go in and out depending upon where the ocean surfaces are relative to the equator. The height of tides generally can vary from one foot to over 10 feet of difference. The shoaling reef will be fixed on the seafloor as described and as the platform for the wave energy collector (WEC). The parallelogram design includes the top and bottom of the parallelogram structure being parallel to the seafloor and generally the water surface. The bottom of the WEC will be connected to the reef in a structural way. If another intermediate parallelogram is first connected to the reef, the WEC can now be connected to the top plate of that new parallelogram. If two bottom axils of the WEC are extended and bent upward, it will serve to hold two floats, one on each side of the WEC. They would be next to the WEC on each side. The floats would serve to locate the top surface and would automatically locate with any tide, high or low. This base addition would allow the WEC to be exactly located just below the surface. The floats could be a bright color to warn boats of the location(s) of the WEC(s).

The present water parallelogram wave energy collector is also used in conjunction with the present inventor's artificial surfing reef described and claimed in U.S. Pat. No. 5,207,531 issued on May 4, 1993 and improved and upgraded in U.S. Pat. No. 8,517,631 issued on Aug. 27, 2013.

Further novel features and other objects of the present invention will become apparent from the following detailed description and discussion.

BRIEF DESCRIPTION OF THE DRAWINGS

Referring particularly to the photographs and drawings for the purpose of illustration only and not limitation, there is illustrated:

FIG. 12 is a representation of the top plan view of the diaphragm and the opening in the posts which are retained around the collars;

FIG. 13 is a pie diagram of the exploded view of the encircled view shown in FIG. 12 showing the section of the top of the diaphragm and collar;

FIG. 14 is a representation of the perspective view of the parallelograms with one plate affixed to the front of the parallelogram and the second plate removed from the parallelogram structure;

In FIG. 18B, the double parallelogram will articulate independently to the right and to the left as described. Also seen in this is a high pressure compression element that can be hinged on the bottom with to top of this single plane compressed as inside the parallelogram. The bladder can be directed into this smaller volume but higher pressure compression. This would offer more PSI and be easier to compress and in the top of the water column in higher energy area. The bottom parallelogram structure may stay unmoved on small wave events but can compress to almost horizontal to fully compress on larger waves and then hide from extra large damaging forces;

DETAILED DESCRIPTION OF EMBODIMENTS OF THE INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Figure 1:
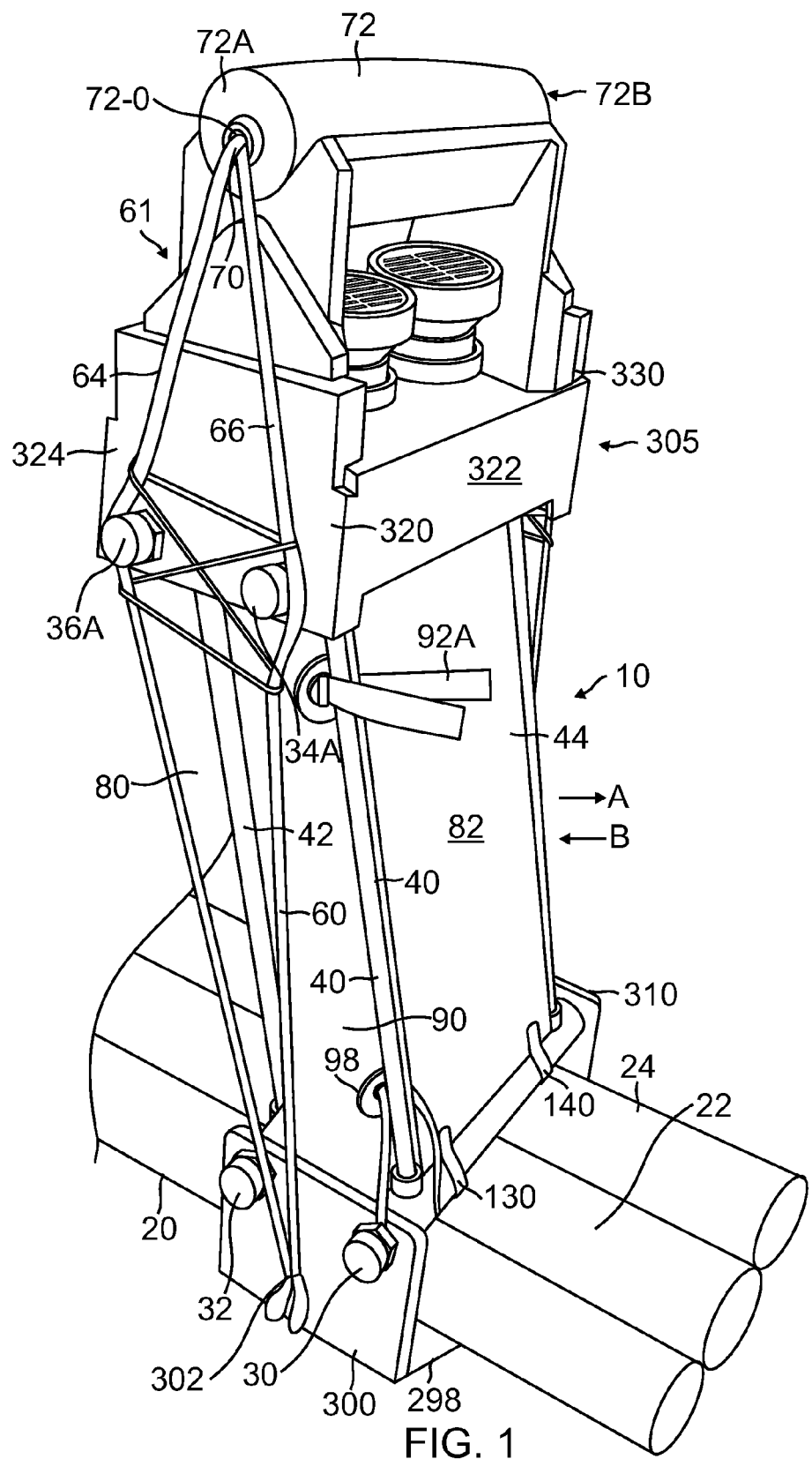
FIG. 1 is a perspective view of the present invention wave energy collector.
Figure 4:
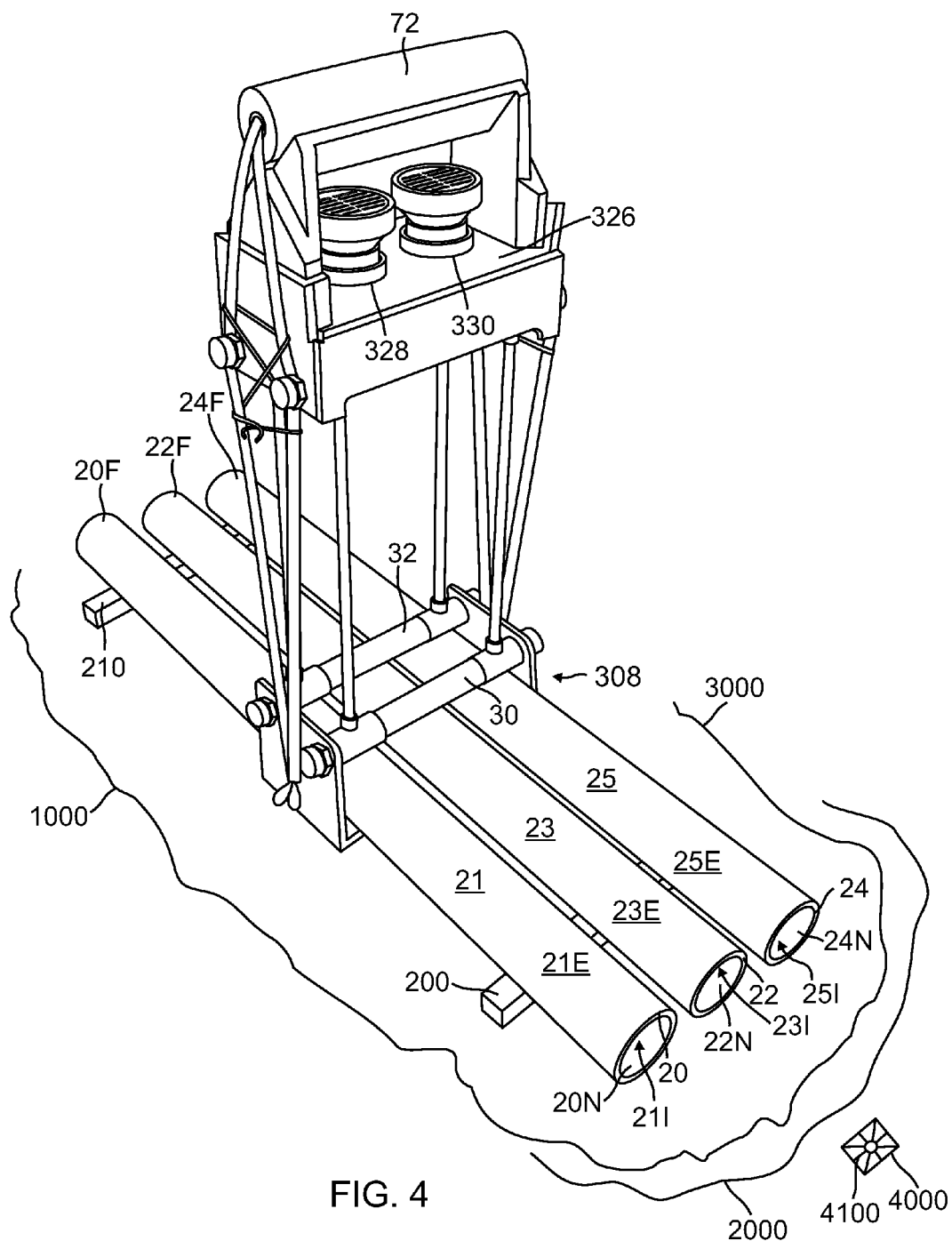
FIG. 4 is a perspective view of the parallelogram structure and longitudinal pipes with the diaphragm removed including a flotation member and the physical components as illustrated in FIG. 1 with the two panels removed to better illustrate the internal structure.

Referring to FIG. 1, there is illustrated one full embodiment of the present invention parallelogram wave energy collector 10. The components will be described to the extent that they are shown in FIG. 1 and will be described in greater detail where they are better illustrated in subsequent figures. The longitudinal pipes which carry the water from the parallelogram structure to the location of the water turbine or other power generating member are illustrated in FIG. 1, with the longitudinal pipes numbered 21, 23 and 25. Additional views of the water carrying pipes 21, 23 and 25 are illustrated in FIG. 4. The entire parallelogram wave energy collector 10 is oriented so that the pipes are facing toward or away from the shoreline with the respective remote end of the pipes 20F, 22F and 24F facing away from the shoreline. Each of these ends is fully sealed so that water cannot escape through the remote ends 20F, 22F and 24F. On the opposite end which is the near end, the near ends 20, 22 and 24 are open so that water can flow out of the pipes at the locations of the pipes which are adjacent the near ends extending to the shore and usually buried under the sand until the open ends 20N, 22N and 24N reach a housing which contains a water turbine so that water exiting the near ends of the pipe 20N, 22N and 24N is exiting under high pressure as will be described later and the water is directed to hit the blades of the water turbine to cause the blades to rotate and generate electrical energy in accordance with water turbine principles. The water turbine is an example of a device used to generate power from the force of water. A turbine does not generate electrical energy. It converts kinetic energy to electrical energy and the water pressure created in the present invention is used to convert wave energy to water pressure and flow. It is the water pressure and flow that is converted by the water turbine to electrical energy.

Referring to FIG. 4, the parallelogram wave energy collector 10 is anchored to the floor of the ocean by anchor bars such as 200 and 210. It will be appreciated that the anchor bars are at spaced apart locations along the length of the pipes so that the entire parallelogram wave energy collector 10 is solidly anchored to the sea bed floor. As described, the anchor bars are attached to the pipes 21, 23 and 25, and the pipes are then anchored to the sea floor bottom by at least one anchor bar. The anchor bars are illustrated as 200 and 210 but it will be appreciated that any anchors which serve to anchor the pipes 21, 23 and 25 to the ocean floor are within the spirit and scope of the present invention.

Figure 2:
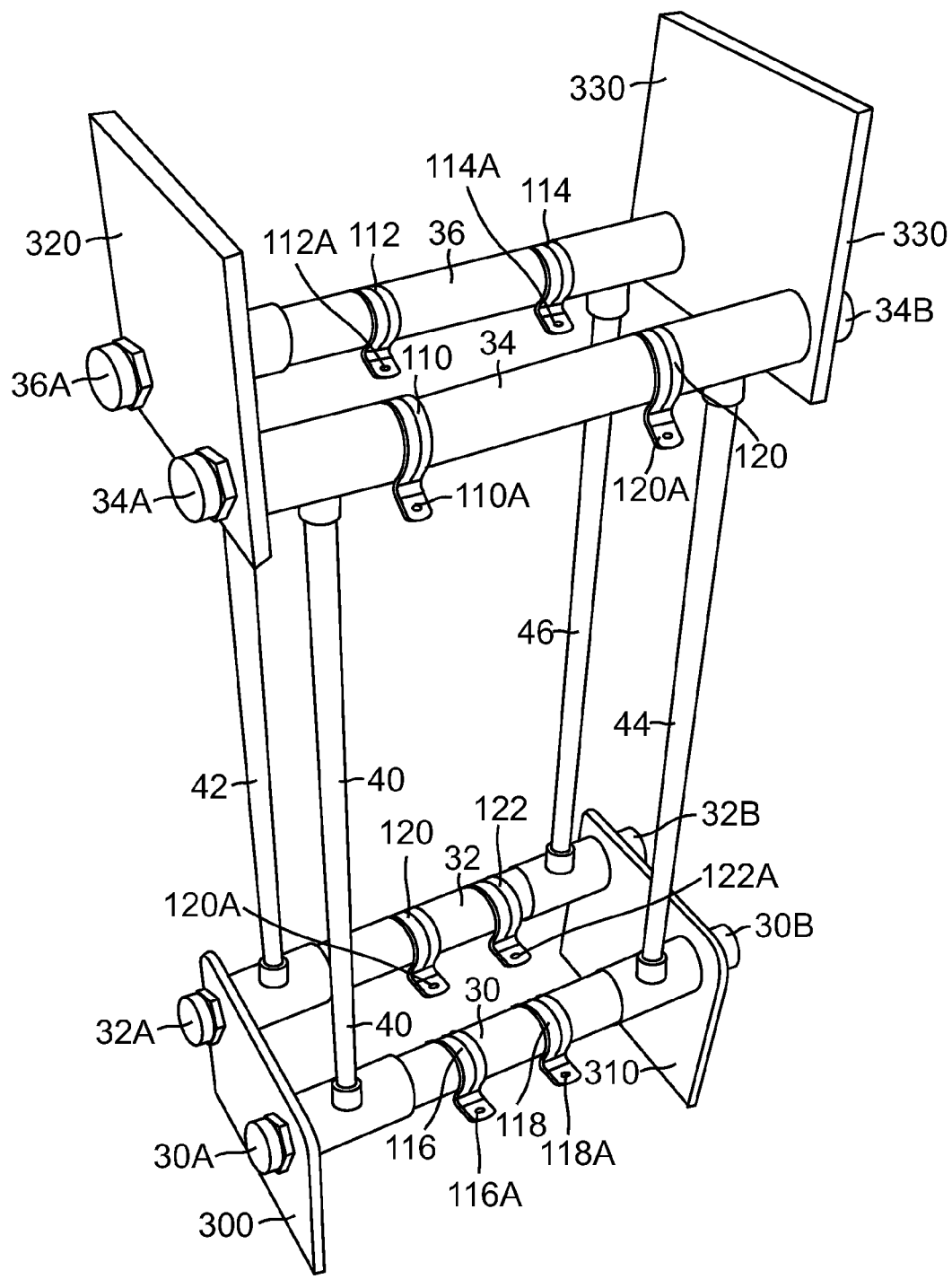
FIG. 2 is a perspective view of the interior transverse pipes and vertical pipes of the parallelogram wave energy collector illustrated in FIG. 1.
Figure 3:
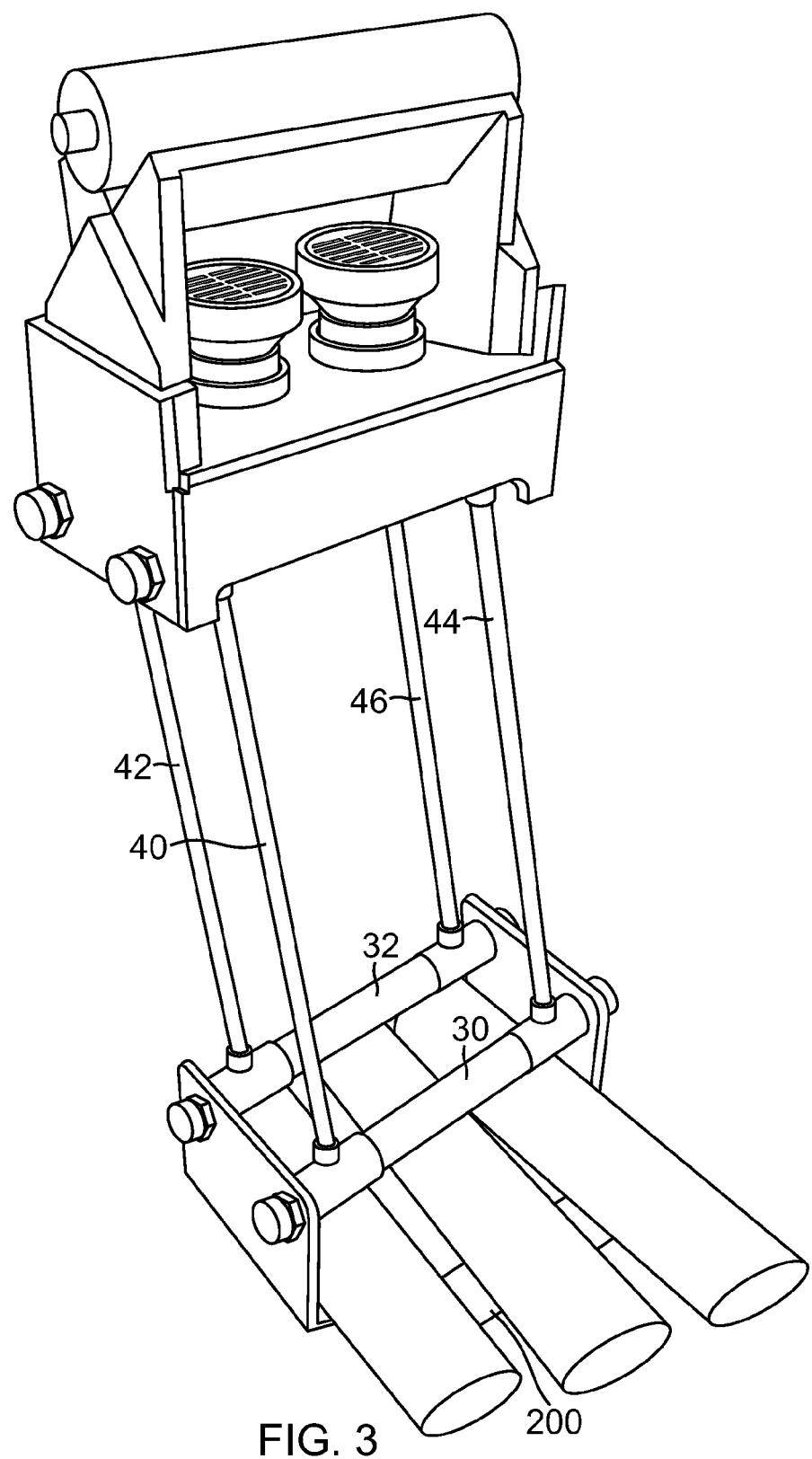
FIG. 3 is perspective view of the transverse pipe components and the vertical pipes illustrated in FIG. 1, also illustrating a perspective view of two one-way intake valves which feed water into the compressible diaphragm.

Referring to FIG. 2, the next components of the parallelogram wave energy collector 10 are the structural rotational mechanisms which enable the parallelogram wave energy collector 10 to rotate in directions away from the shore and toward the shore. These consist of two transverse pipes 30 and 32. Transverse pipe 30 has a first end 30A and a second end 30B which are respectively rotatably retained to a first retaining structure 300 and a second retaining structure 310. The second lower transverse pipe 32 has an end 32A and a second end 32B which are also rotatably connected to oppositely disposed lower structural members 300 and 310.

Referring to FIG. 1 and FIG. 2, the upper transverse pipes 34 and 36 respectively have first end 34A and 36A and second end 34B and a second end not shown, which second end is opposite end 36A, which are respectively rotatably connected to a pair of upper structural members 320 and 330 which in turn serve to rotatably retain transverse upper pipes 334 and 336. Further, referring to FIG. 1 and FIG. 2, there are lower transverse pipes 30 and 32 having respective ends and respective second ends 32B and 32D which are rotatably connected to a pair of lower structuring members 300 and 310.

Figure 5:
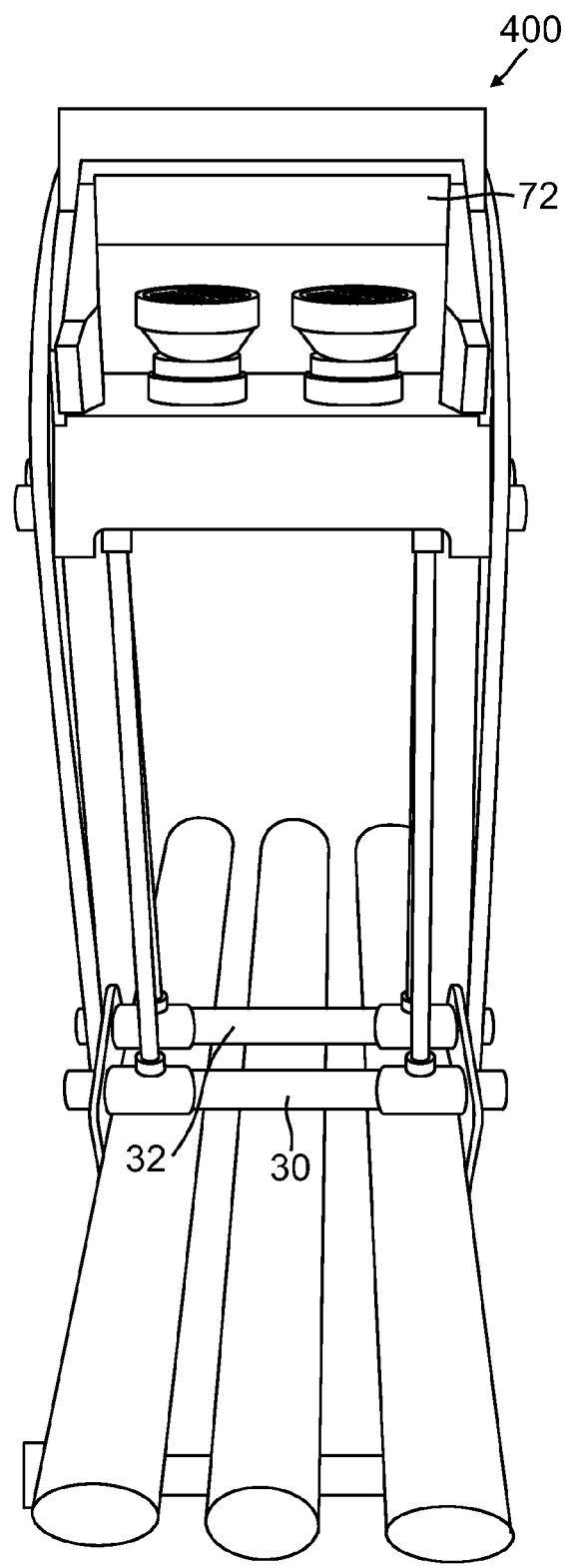
FIG. 5 is an end view of the internal structure of the parallelogram wave energy collector which has the same components as illustrated in FIG. 4.
Figure 7:
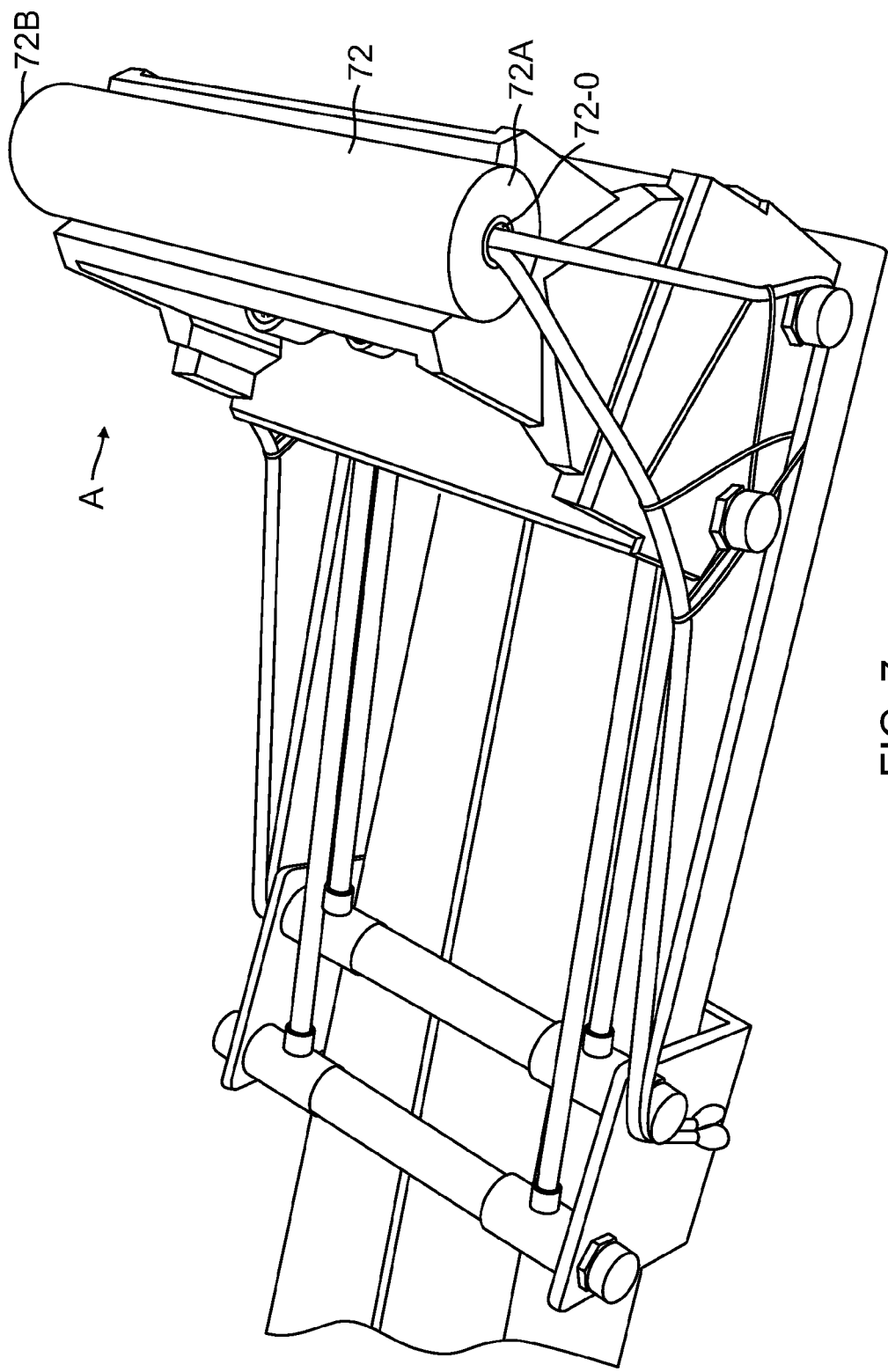
FIG. 7 is a side perspective view of the internal components of the parallelogram structure in the completely rotated condition where the diaphragm has been totally compressed and the parallelogram structure is essentially now generally horizontal.

Referring to FIGS. 5 and 7, the transverse structure has a top section 400 which rotatably retains a flotation member 72 having a first end 72A and an opposite second end 72B illustrated in FIG. 1 but shown not illustrated in FIG. 1. The lower base structure 300 has a retaining bolt 302 and the opposite retaining structure has a retaining bolt not shown. The flotation member 72 has a transverse opening 72-O from one end 72A to 72B. The flexible, stretchable parallelogram member illustrated in FIG. 1 and also in FIG. 7 stretches through the transverse opening of the rotation member 72 and then extends around opposite ends of transverse pipes 34A and 36A through sections 66 and 64 and then extend into bolt retaining member 302 and oppositely extend around the opposite ends 34B (second end not shown) of upper transverse pipes 34 and 36 and then are retained by an oppositely disposed retaining member bolt affixed to structure member section 300. The flotation member 72 can also be described as a flotation or ballast element.

As illustrated in FIG. 2, the lower transverse pipe 30 and 32 and upper transverse pipe 34 and 30 contain a pair of retaining sleeves. Two of them 110A and 120A are illustrated in FIG. 2. It will be appreciated that there are comparable such retaining sleeves which are wrapped around transverse pipes 30 and 36. Each retaining sleeve is wrapped around the pipe and respectively has an opening such as 110A and 120A. Affixed to the openings are a first plate 80 which is affixed through threaded screws which extends through openings 110A and 110B and oppositely disposed sleeves 130 and 140 illustrated in FIG. 1 which also have comparable openings to retain transverse plate 80. It will be appreciated that the second transverse plate which is not illustrated is affixed between the retaining members affixed to transverse pipes 36 and 32 so that the pair of plates are oppositely disposed between an opening between the transverse pipes 30 and 32 at the bottom and 34 and 36 at the top.

Figure 8A:
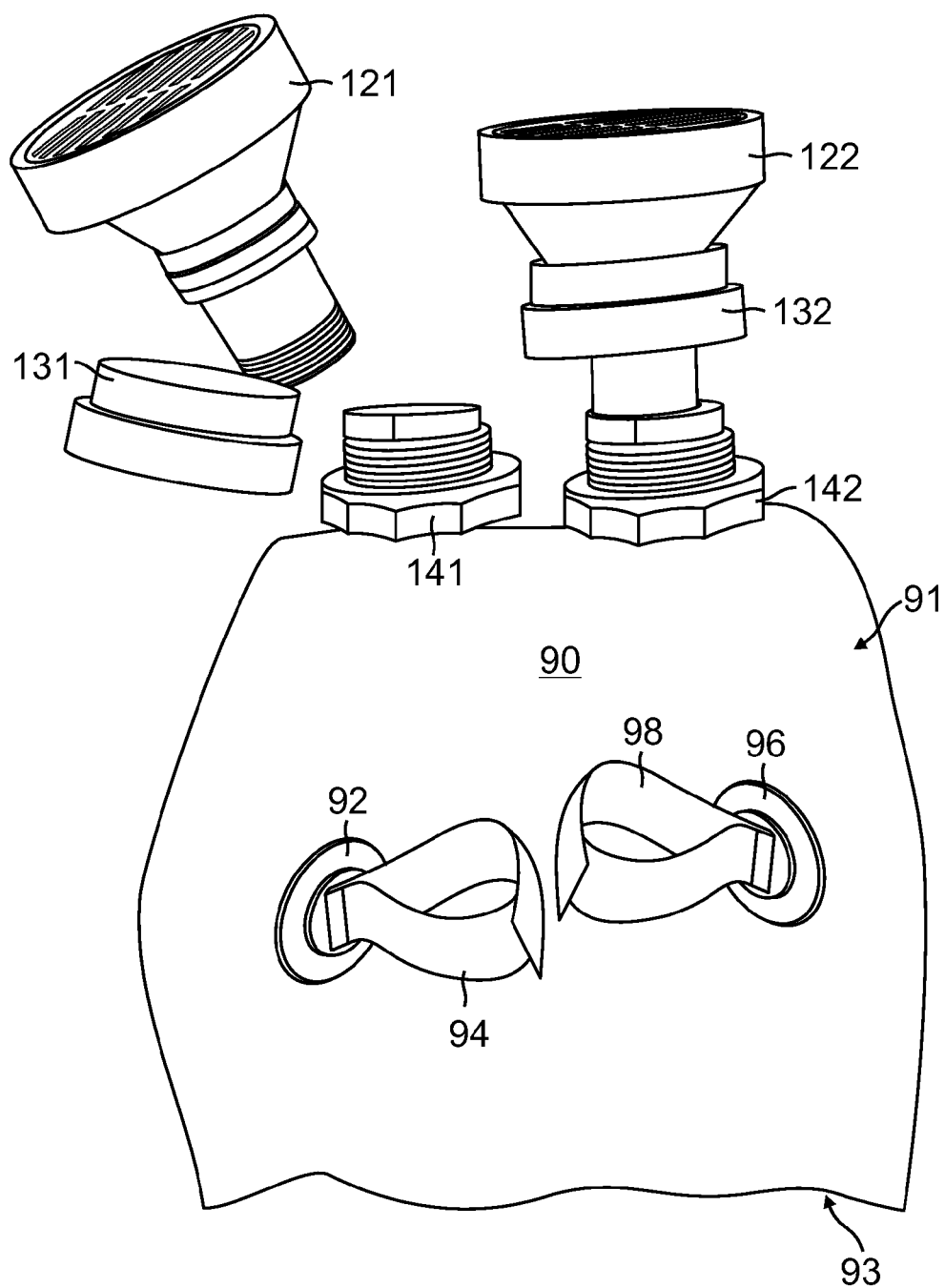
FIG. 8A is a enlarged view of the diaphragm of the present invention with a pair of one-way intake check valves affixed to the top of the flexible diaphragm.
Figure 8B:
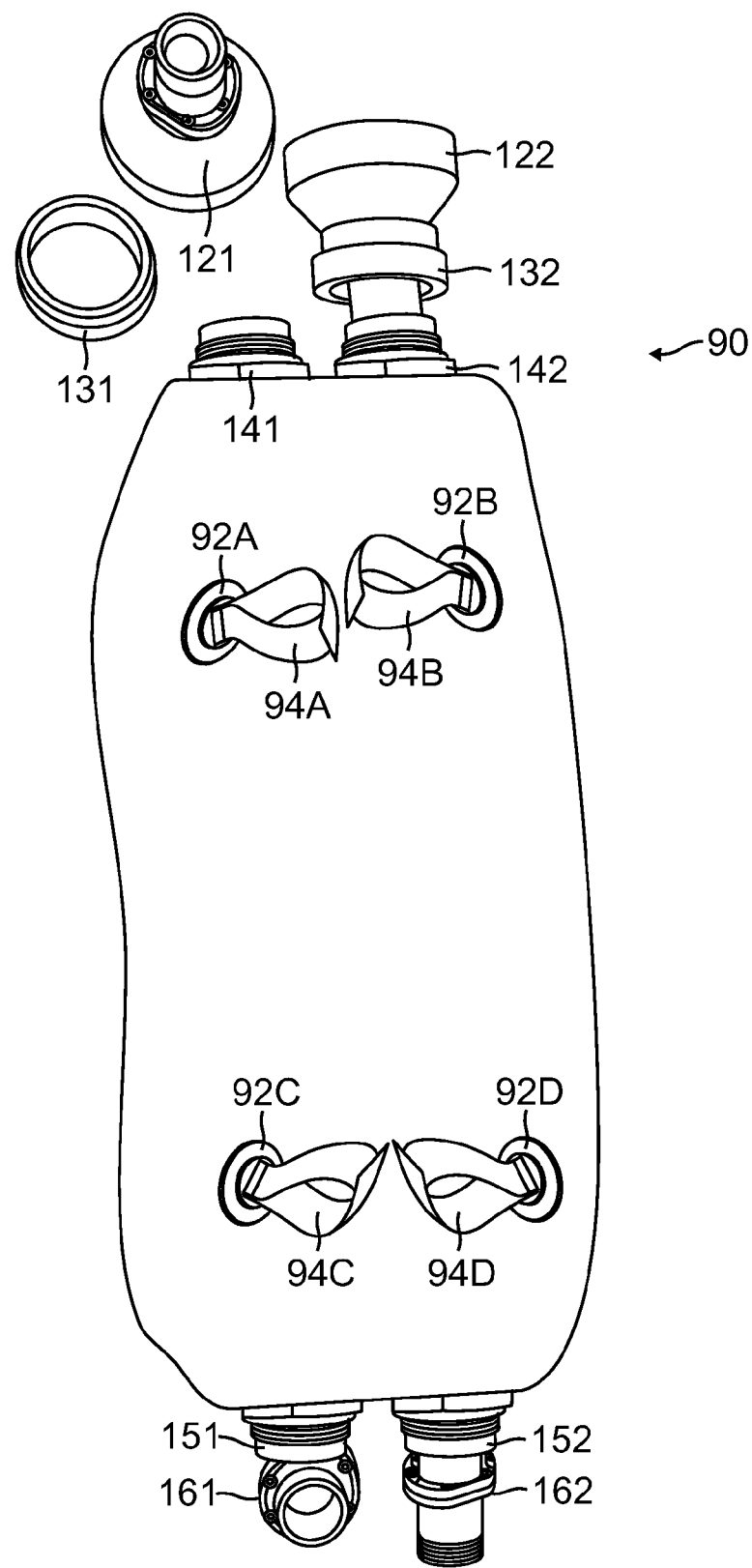
FIG. 8B is an enlarged view of the entire diaphragm of the present invention showing the upper and lower one-way check valves.

Retained between the transverse pipes is a flexible diaphragm 90 which can be made of flexible material such as polyurethane. A section of the polyurethane diaphragm is best illustrated in FIG. 8A. The diaphragm 90 contains transverse retaining members 92A, 92B, 92C, and 92D which retains an oppositely disposed pair of mating hook and loop fasteners 94A, 94B, 94C, and 94D. It will be appreciated that comparable retaining members are located on the opposite side of the flexible diaphragm. Retaining members and mating hook and loop fasteners as illustrated in FIGS. 1, 8A, and 8B. It will be appreciated that the opposite section of the flexible diaphragm also contains retaining members and hook and loop members on the upper section and also oppositely disposed at the lower section approximately parallel to hook and loop fastener members 94A, 94B, 94C, and 94D and retaining members 92A, 92B, 92C, and 92D. The mating hook and loop fasteners are respectively wrapped around the vertical poles. Hook and loop fasteners 94A and 94C are wrapped around pole 40 and hook and loop fasteners 94B and 94 D are wrapped around pole 44. The lower hook and loop fasteners on the diaphragm such as fastener members 92A is illustrated in FIG. 1. The diaphragm contains a pair of lower affixed connection members 161 and 162 to which lower one-way exit valves 151 and 152 are respectively threadedly connected which then connect to longitudinal pipes 20, 22, and 24. It is within the scope of the present invention to have a multiple number of valve connections exiting flexible diaphragm 90 to a multiple number of longitudinal pipes.

Referring to FIG. 8B, upper one-way intake valves 121 and 122 are threadedly connected to connection members 131 and 132 which are respectively affixed and fluidly connected to the upper diaphragm threaded connectors 141 and 142 of flexible diaphragm 90. By way of example, the one-way intake valves can be 4" in diameter and reduced to a 1½" diameter pipe which is threadedly affixed to the respective threaded members of the upper one-way valve receiving members. Similarly, at the lower end of the diaphragm there are one-way check valves extending through the bottom of the diaphragm so that fluid can enter the diaphragm through one-way check valves 121 and 122 and exit the diaphragm through lower check valves 151 and 152 in the diaphragm. The lower check valves extend through the diaphragm and into connecting members which fluidly connect the open ends of the lower one-way check valves into the pipes 20, 22 and 24.

Figure 6:
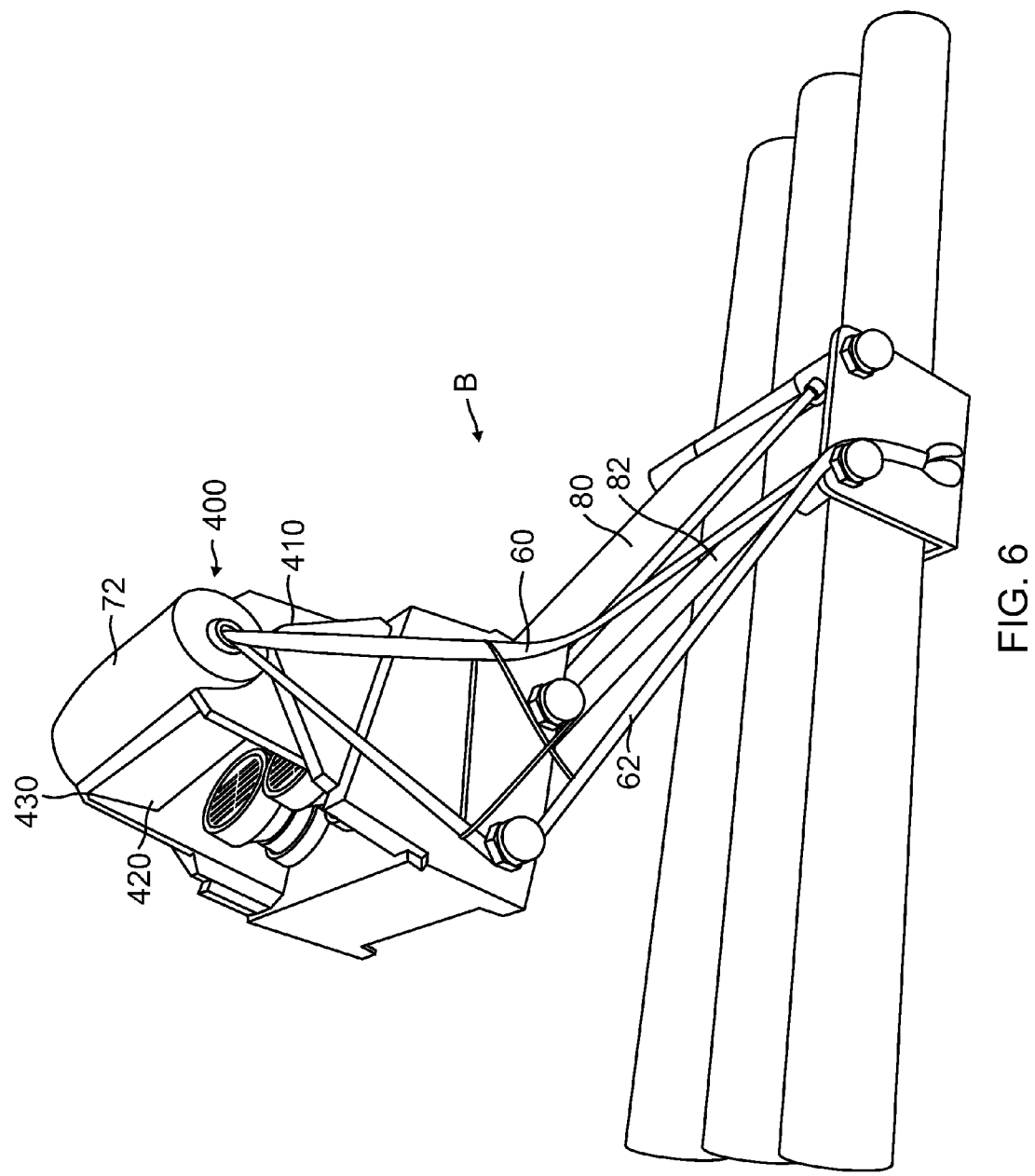
FIG. 6 is a side perspective view of the internal components of the wave energy collector moving in one rotational direction when the plates have been hit by a wave, causing the parallelogram structure to rotate in one direction so that the two plates also rotate with the inflatable diaphragm between them and compressing the diaphragm.

In operation, the parallelogram wave energy collector 10 is affixed to the ocean floor as previously described or alternatively, is affixed to the reef of the invention as described and claimed in U.S. Pat. No. 8,517,631 for "SHORELINE EROSION MITIGATION DEVICE" issued on Aug. 27, 2013. When affixed to the reef, each plumbing pipe can be affixed to the reef when it is on dry land before the reef, plumbing pipes and parallelogram wave energy collector are floated into the water. The anchors which will anchor the reef can be set in advance. The reef is towed to the site where the pipes of the parallelogram wave energy collector will be installed onto the reef and thereafter towed out to the ocean with anchors retaining the reef to the ocean floor. The wave energy collector is affixed to the bottom of the sea bed through the anchors 200 and 210 (see FIG. 4) as previously described and the parallelogram wave energy collector 10 is initially in an erect position as shown in FIG. 1. When an incoming wave hits the parallelogram wave energy collector 10 and especially the rear plate 80, the parallelogram wave energy collector 10 rotates the direction of the shore so that the diaphragm 90 is compressed between the plates 80 and 82. It is important to note that the positioning of the upper one-way check valves 121 and 122 and the lower one-way check valves 151 and 152 are positioned so that the upper check valves are above the two plates and the lower check valves are below the two plates so that they do not become squashed when the diaphragm is compressed. As the diaphragm is compressed into the flat stage as illustrated in FIG. 7, water under pressure is forced into the pipes 20, 22 and 24 and is forced out of the respective openings 20N, 22N and 24N. The pipes are initially filled with water and therefore, the water flowing under pressure from the compressed diaphragm causes the water to exit the pipes with a force to it the rotating wheel of the water turbine. When the incoming waves hit the parallelogram wave energy collector 10, the plates 80 and 82 are caused to rotate in a direction as illustrated in FIG. 6 which is in a direction away from the shore. Again, this rotational energy causes the diaphragm 90 to be compressed and during the entire compression session, the water is fed under pressure from the one lower one-way check valves into the pipes so it continuously forces water under pressure out the openings of the pipes and into the blades of the water turbine. It will be appreciated that the motion from the waves is continuous so that the parallelogram wave energy collector 10 is rotating toward the shore and then back away from the shore, continuously generating water under pressure which enters the pipes which then exits under the pipes to hit the wheel of the water turbine to cause the wheel to continuously rotate and generate electrical energy.

The waves from the ocean to the shore are traveling in a direction of arrow A illustrated in FIGS. 1 and 7 and the waves traveling from the shore into the ocean is illustrated in the direction of arrow B as illustrated in FIGS. 1 and 6.

It will be appreciated that there are a multiplicity of wave energy collectors affixed along the length of the pipes 20, 22 and 24 in spaced apart locations so that one wave energy collector will not hit an adjacent wave energy collector but the rotation is back and forth in a continuous kinetic energy to continuously generate water into the pipes under pressure so that the water will exit the pipes in the opening and hit the rotating wheels of the water turbine to generate electricity.

Defined in detail, an embodiment of the present invention is a wave energy collector (10) used in conjunction with ocean water (3000), an ocean floor (1000), a shoreline (2000) and an on shore water turbine (4000) with blades (4100), the wave energy collector (10) comprising: (a) at least two aligned hollow pipes (21, 23) with a first hollow pipe (21) having an exterior wall (21E) encircling an interior chamber (21I) with a sealed rear end (20F) and an open front end (20) and a second hollow pipe (23) having an exterior wall (23E) encircling an interior chamber (23I) with a sealed rear end (22F) and an open front end (22), a first anchor bar (200) extending transversely across the first hollow pipe (21) and the second hollow pipe (23) and located in proximity to the front end (20-22) of each first (21) and second hollow pipe (23) and a second anchor bar (210) extending transversely across the first hollow pipe (21) and the second hollow pipe (23) and located in proximity to the rear end (20F) and (22F) of each first (21) and second (23) hollow pipe; (b) an upper structure (305) including a hollow enclosure having a first transverse wall (320) and a second transverse wall (330) with a first sidewall (322) and a second sidewall (324) and a top wall (326) having a pair of spaced apart openings (328, 330), a first upper structure pipe (34) having a first end (34A) rotatably supported through the first transverse wall (320) and a second end (34B) rotatably supported through the second transverse wall (330), with a pair of spaced apart retaining sleeves (110, 120) on the first upper structure pipe (34) and a second upper structure pipe (36) having a first end (36A) and a second end (36B) rotatably supported through the first transverse wall (320) and a second transverse wall (330), with a pair of spaced apart retaining sleeves (112, 114) on the second upper structure pipe (36), a flotation support structure (400) having a first sidewall (410) and a spaced apart second sidewall (420) affixed to the top wall (326) and supporting a flotation member (72) in a retaining well (430); (c) a lower structure (308) including a hollow enclosure having a first transverse wall (300) and a second transverse wall (310) supported by a base wall (298), a first lower structure pipe (30) having a first end (30A) rotatably supported through the first transverse wall (300) and a second end (30B) rotatably supported through the second transverse wall (310) with a pair of spaced apart retaining sleeves (116, 118) on the first lower structure pipe (30) and a second structure pipe (32) having a first end (32A) rotatably supported through the first transverse wall (300) and a second transverse end (32B) rotatably supported through the second transverse wall (310) with a pair of spaced apart retaining sleeves (120, 122) on the second lower structure pipe (32); (d) a first support pole (40) supported between first upper structure pipe (34) and first lower structure pipe (30), a second spaced apart support pole (44) supported between first upper structure pipe (34) and first lower structure pipe (30) and a third support pole (42) supported between second upper structure pipe (36) and second lower structure pipe (32), a fourth spaced apart support pole (46) supported between second upper structure pipe (36) and second lower structure pipe (32); (e) a flexible stretchable parallelogram member (61) extending through a transverse opening (72-O) in the flotation member (72) and extending around the first ends (34A, 36A) of the first and second upper structure pipes (34, 36) and retained on first transverse wall (300) of the lower support (308) and extending around the second ends (34B and 36B) of the first and second upper structure pipes (34, 36) and retained on the second transverse wall (310) of the lower support (308); (f) a flexible compressible water retaining diaphragm (90) having a boundary wall (91) surrounding an interior chamber (93), a pair of spaced apart one-way water intake valves (121, 122) respectively supported through the pair of spaced apart openings (328, 330) in the top wall (326) of the upper structure (305), and extending into the interior chamber (93) of the diaphragm (90), a pair of spaced apart one-way water exit valves (151, 152) retained on the flexible diaphragm (90) and extending into fluid coupling members (161, 162) respectively affixed to the at least two aligned hollow pipes (21, 23), the diaphragm (90) having a first upper retaining member (92A) extending from the diaphragm (90) around the first support pole (40), a second upper retaining member (92) extending from the diaphragm and extending around second support pole (44), a first lower retaining member (92C) extending from the diaphragm (90) around the first support pole (40), and a second lower retaining member (92D) extending from the diaphragm (90) around the second support pole (44), a third upper retaining member extending from the diaphragm (90) around the third support pole (42), and a fourth upper retaining member extending from the diaphragm (90) around the fourth support pole (46), and a third lower retaining member extending from the diaphragm (90) around the third support pole (42), and a fourth lower retaining member extending from the diaphragm (90) around the fourth support pole (46), and (g) a first transverse plate (82) retained through the first pair of spaced apart retaining sleeves (110, 120) of the first upper structure pipe (34) and a pair of spaced apart retaining sleeves (116, 118) on the first lower structure pipe (30), a second transverse plate (80) retained through the first pair of spaced ap retaining sleeves (112, 114) of the second upper structure pipe (36) and a pair of spaced apart retaining sleeves (120, 122) on the second lower structure pipe (32), the flexible compressible diaphragm (90) retained between the first plate (82) and the second plate (80); (h) whereby, the wave energy collector (10) is submerged in ocean water (3000) and retained on the ocean floor (1000) by anchor members surrounding the at least two hollow pipes used in conjunction with the first anchor bar (200) and the second anchor bar (210), the aligned pipes (21, 23) positioned so that their respective rear ends (20F, 22F) face away from the shoreline (2000) and their respective first ends (20, 22) extend into the shoreline (2000) and terminate adjacent the water turbine (4000) and its blades (4100), ocean water (3000) enters the flexible compressible diaphragm (90) through the pair of one-way intake valves (121, 122), a tide wave in the direction of the shoreline (2000) causes the upper structure (305), the lower structure (308), first, second, third and fourth support poles (40, 44, 42, 46) and the first plate (82) and second plate (80) to rotate to a position against the two aligned pipes (21, 23) through the flotation member (72) and the flexible stretchable parallelogram member (61) to compress the flexible compressible diaphragm (90) to force the ocean water (3000) in the diaphragm (90) to exit through the lower pair of one-way exit valves (151, 152) into the aligned pipes (21, 23) and the ocean water (3000) exiting the aligned pipes (21, 23) and impacting the blades (4100) of the water turbine (4000) (as illustrated in FIG. 7) to cause the water turbine (4000) to generate power, a tide wave in the direction away from shoreline (2000) causes the upper structure (305), the lower structure (308), the first, second, third and fourth support poles (40, 44, 42 and 46) and the first plate (82) and the second plate (80) to rotate to an initial position (see FIG. 1) and then in the opposite direction against the aligned pipes (21, 23) (see FIG. 6) to move through the flotation member (72) and the flexible stretchable parallelogram member (61) to refill the interior bladder (93) with ocean water (3000) and then compress the flexible compressible diaphragm (90) to force the ocean water (3000) in the diaphragm (90) to exit through the lower pair of one-way exit valves (151, 152) into the aligned pipes (21, 23) and the ocean water (3000) exiting the aligned pipes (21, 23) to exit under force through the first open ends (20, 22) of the at least two aligned pipes (21, 23) and impact the blades (4100) of the water turbine (4000) to cause the water turbine (4000) to generate power, the process repeated as the tide wave moves in the opposite direction.

The additional parts are not set forth in the above detailed description of the preferred embodiment but are also shown in the drawings. A third aligned pipe 25 having a sealed rear end 24F, an open front end 24 with an interior opening 24N having an exterior wall 25E and surrounding an interior chamber 25I is also disclosed. The retaining sleeve 110 has an opening 110A through which an affixation member is inserted through the opening 110A into the first retaining plate 82, the retaining sleeve 120 having an opening 120A through which an affixation member is inserted extending through the opening 120A into the first retaining plate 80 is affixed. The retaining sleeve 116 having an opening 116A through which the affixation member extends through opening 116A into the first plate (82) and the retaining sleeve 118 has an opening 118A through which the affixation member extends through the opening 118A into the first plate 82. Similarly, retaining sleeve 112 has an opening 112A through which an affixation member extends through opening 112A into second plate 80, the affixation sleeve 114 has an opening 114A through which an affixation member extends through opening 114A into second plate 80 retaining sleeve 120 has an opening 120A through which an affixation member extends through the opening 120A into second plate 80 and retaining sleeve 122 has an opening 122A through which a retaining member extends through the opening 122A and into the second plate 80.

The detailed description of the present invention also includes elements "b", "c", "d", "e", "f" and "g" as discussed above and used with element "a" to operate in the manner as set forth in claim element "h" to have a multiplicity of wave energy collectors used to create power from the water turbine.

Defined more broadly, an embodiment of the present invention is a wave energy collector (10) used in conjunction with ocean water (3000), an ocean floor (1000), a shoreline (2000) and an apparatus which converts water pressure and flow to electrical energy (4000), the wave energy collector (10) comprising: (a) at least two aligned hollow pipes (21, 23) with a first hollow pipe (21) having an exterior wall (21E) encircling an interior chamber (21I) with a sealed rear end (20F) and an open front end (20) and a second hollow pipe (23) having an exterior wall (23E) encircling an interior chamber (23I) with a sealed rear end (22F) and an open front end (22), at least one anchor member affixed to the at least two hollow pipes (21, 23); (b) an upper structure rotatably retaining a first upper structure member and a second upper structure member with at least one retaining member on the first upper structure member and at least one retaining member on the second upper structure member, the upper structure including a transverse upper wall with at least one opening, a flotation support structure extending from the at least one upper wall and retaining a flotation member; (c) a lower structure rotatably retaining a first lower structure member and a second lower structure member with at least one retaining member on the first lower structure member and at least one retaining member on the second lower structure member; (d) a multiplicity of support poles retained between the upper structure and the lower structure; (e) a flexible stretchable parallelogram member extending through a transverse opening in the flotation member and extending around the outer ends of the first upper structure member and the second upper structure member and retained on opposite walls of the lower structure; (f) a flexible compressible water retaining diaphragm having a boundary wall surrounding an interior chamber (93), at least one water intake valve supported on the at least one opening in the upper transverse wall of the upper structure and also supported on the compressible water retaining diaphragm and extending into an interior chamber (93) of the flexible compressible diaphragm and at least one water exit valve extending from an interior of the flexible compressible diaphragm and in fluid communication with the at least two aligned hollow pipes, and (g) a first transverse plate (80) retained by support members between the upper structure and the lower structure and a second transverse plate (82) retained by support members of the upper structure and the lower structure, the first transverse plate and the second transverse plate spaced apart with the flexible compressible diaphragm located between the first transverse plate and the second transverse plate; (h) whereby, the wave energy collector (10) is submerged in ocean water (3000) and retained on the ocean floor (1000) by at least one anchor, the at least two aligned hollow pipes (21, 23) positioned so that their respective rear ends (20F, 22F) face away from the shoreline (2000) and their respective first ends (20, 22) extend into the shoreline (2000) and terminate adjacent the apparatus which converts water pressure and flow to electrical energy (4000), ocean water (3000) enters the flexible compressible diaphragm (90) through the at least one one-way intake valve, a tide wave in the direction of the shoreline (2000) causes the upper structure (305), the lower structure (308), the multiplicity of support poles, the first transverse plate and second transverse plate to rotate to a position against the at least two aligned hollow pipes (21, 23) through the flotation member (72) and the flexible stretchable parallelogram member (61) to compress the flexible compressible diaphragm (90) to force the ocean water (3000) in the diaphragm (90) to exit through the at least one one-way exit valve into the at least two aligned pipes (21, 23) and the ocean water (3000) exiting the at least two aligned pipes (21, 23) to exit under force through the first open end and the second open end of the at least two aligned pipes and impacting the apparatus which converts water pressure and flow to electrical energy, a wave in the direction away from shoreline (2000) causes the upper structure (305), the lower structure (308), the multiplicity of support poles, the first transverse plate, the second transverse plate to rotate to an initial position in order to enable the flexible compressible bladder to be filled with ocean water and then rotate in the opposite direction against the aligned pipes (21, 23) to move through the flotation member (72) and the flexible stretchable parallelogram member (61) to compress the flexible compressible diaphragm (90) to force the ocean water (3000) in the diaphragm (90) to exit through the at least one one-way exit valve into the aligned pipes (21, 23) and the ocean water (3000) exiting the aligned pipes (21, 23) to exit under force through the first open ends (20, 22) of the at least two aligned pipes (21, 23) and impact the apparatus which converts water pressure and flow to electrical energy.

The present invention as defined more broadly, further includes elements "b", "c", "d", "e", "f" and "g" as discussed above and used with element "a" to operate in the manner as set forth in claim element "h" to have a multiplicity of wave energy collectors used to create power from the water turbine.

Figure 9:
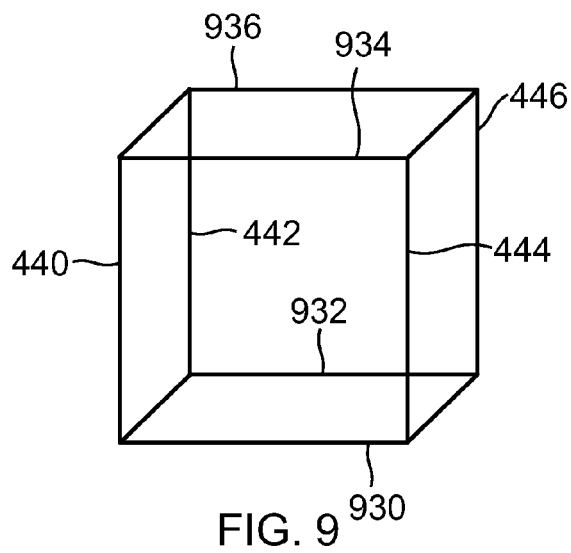
FIG. 9 is a representation of the parallelogram structure as previously described where there are four posts.
Figure 10:
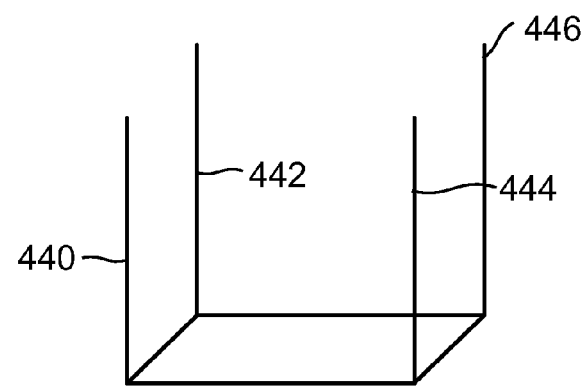
FIG. 10 is a representation of the four posts before they are in the erect condition and before they are converted to a parallelogram structure.

FIG. 9 is a representation of the parallelogram structure as previously described where there are the four posts which are numbered 440, 442, 444 and 446 and rotate in a parallelogram-type fashion as previously discussed. The posts are initially shown in their erect condition in FIG. 10.

Figure 11:
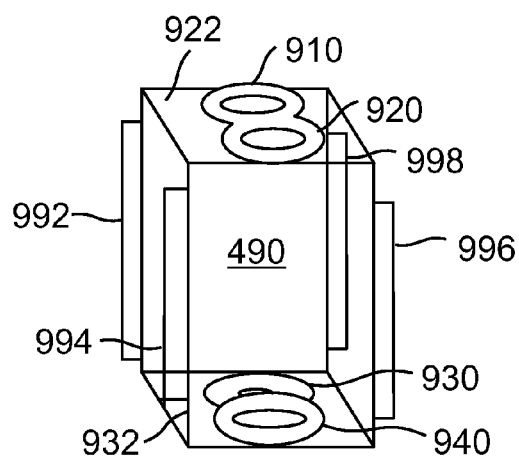
FIG. 11 is a representation of the diaphragm showing the one-way intake valves on top and the one-way exit valves on the bottom and also showing retention collars in place of the mating hook and loop fasteners to retain the diaphragm to posts of the parallelogram structure.

The diaphragm is illustrated in FIG. 11 and is numbered 490. The upper one-way check valves numbered 910 and 920 on the upper section of 922 and 930 and 940 on the lower sections of the diaphragm are as previously described. In this case, the mating hook and loop fasteners are instead illustrated as collars 994, 996, 992 and 998 with the upper opening 992A, 998A, 994A and 996A shown in FIG. 12 with the upper check valves 910 and 920 also illustrated. The pie sections shown in FIG. 13 illustrate the portion of the diaphragm covered by the collars. Referring to FIGS. 9 and 12, each collar is respectively over a pipe. Pipe 994A fits over and through pipe 440, pipe 996A fits over and through pipe 444 and pipe 992A fits over and through pipe 442 and pipe 998A fits over and through pipe 996. Therefore, the diaphragm 90 is tightly retained onto the four posts 440, 442, 444 and 446 so that the diaphragm 90 is held in place during the previously discussed compression and expansion cycles to facilitate water entering and exiting the diaphragm during repetitive cycles.

Therefore, the diaphragm is retained by the pipes. The first plate which is 960 and the second plate which is 962 are affixed through the affixation members previously discussed and are illustrated with respect to front plate 996 as 1110, 1120, 1130 and 1140. It will be appreciated that there are comparable affixation members which affix the rear plate to the transverse pipes. The transverse pipes are numbered in FIG. 9 as 934 and 936 for the upper pipes and 930 and 932 for the lower pipes. Therefore, the graphic illustration shows the comparable illustration in the photographs.

Figure 15:
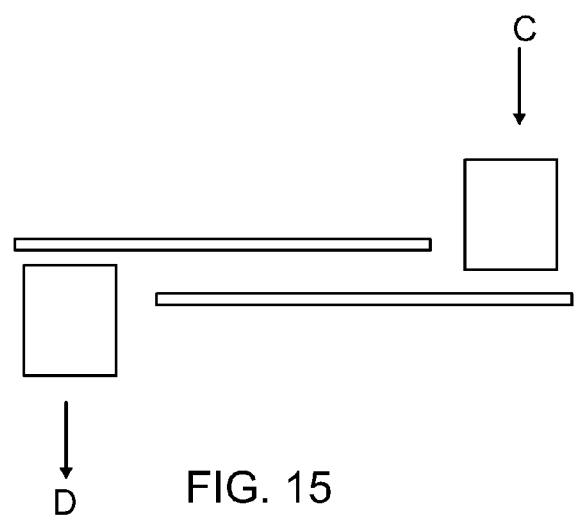
FIG. 15 is a representation of the top view showing the movement of the plates and diaphragm in one direction and in the opposite direction as waves hit the parallelogram wave energy collector.

FIG. 15 is a top view showing the movement of the plates and diaphragm in one direction and in the opposite direction as the wave hits the parallelogram wave energy collector 10 as previously described. FIG. 15 is also a mechanical and functional concept drawing of the side view of the parallelogram wave energy collector in the compressed state when a wave has pushed it down. This shows that the water always goes into the top valves in the direction of the arrow C shown on the right. The bars depict the compression plate and the box on the left represents the water valve with the water being forced down and out into the plumbing pipes in the direction of the arrow D on the left.

Figure 16:
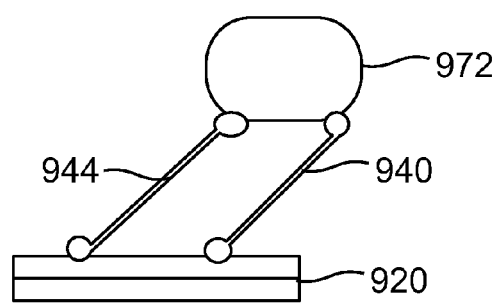
FIG. 16 is a representation showing a flotation member and pipe between parallelogram pipe sections to again show the rotational motion of the parallelogram wave energy collector.

FIG. 16 shows the flotation member 972 and pipe 920 between parallelogram pipe sections 940 and 944, the flotation can be adjustable end important to assist the parallelogram wave energy collector to reload with water to rise upward in the event a reciprocating force is not present. Then with a force from either side it will act to force water into the pipe.

Figure 17:
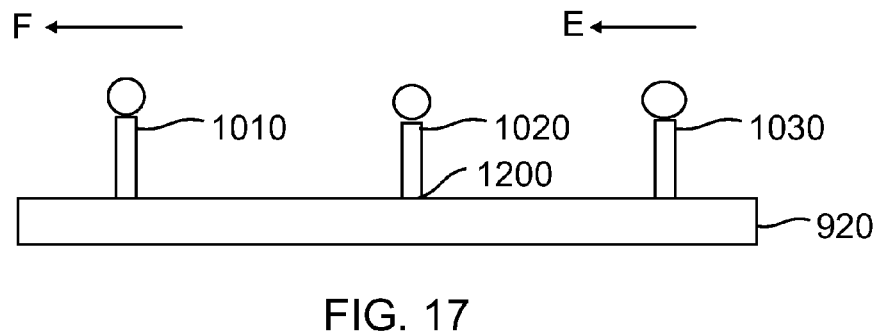
FIG. 17 is a representation showing a multiplicity of parallelogram structures affixed along the length of the pipes and showing the flow of water in the direction toward the shoreline.

FIG. 17 shows a multiplicity of the wave energy collectors such as 1010, 1020, 1030 affixed in spaced apart aligned locations with the water being forced through pipes such as 920 in a direction toward the shoreline under pressure as described above. An energy collector such as 1020 will connect to a pipe such as 920 with T-shaped pipe fittings such as 1200. It is within the scope and spirit of this invention to have multiple connections from a diaphragm such as 90 to a pipe such as 920.

Therefore, the wave energy gets stronger as it moves to shore as indicated with the arrows on top as it has less water in shallow water and as described an observed in nature. The head pressure pushed out of the diaphragm must be the same or greater than in the plumbing pipes but because the wave energy will get stronger, it will function to continue to maintain a good increasing head pressure as the water moves to shore as indicated with the arrows E and F as shown in FIG. 17 in the pipes. Some resistance of existing water in the pipes will cause the flow of water to lose some head pressure but the head pressure will be regained with the next parallelogram wave energy collector cycle. The head pressure and the wave energy will travel the same way to the shore and should increase until the wave brakes or dissipates. The water pressure will continue from the last parallelogram wave energy collector to the turbines on the shore and lose some energy from the pipe resistance, but this encourages the higher pressure behind it to move through the pipe to the slightly lower pressure and the resultant water pressure is positive and retains sufficient pressure in the pipes to take the water if enough wave energy is present so that the force of the water on the turbine will enable the turbine to generate electrical energy.

Figures 18A, 18B:
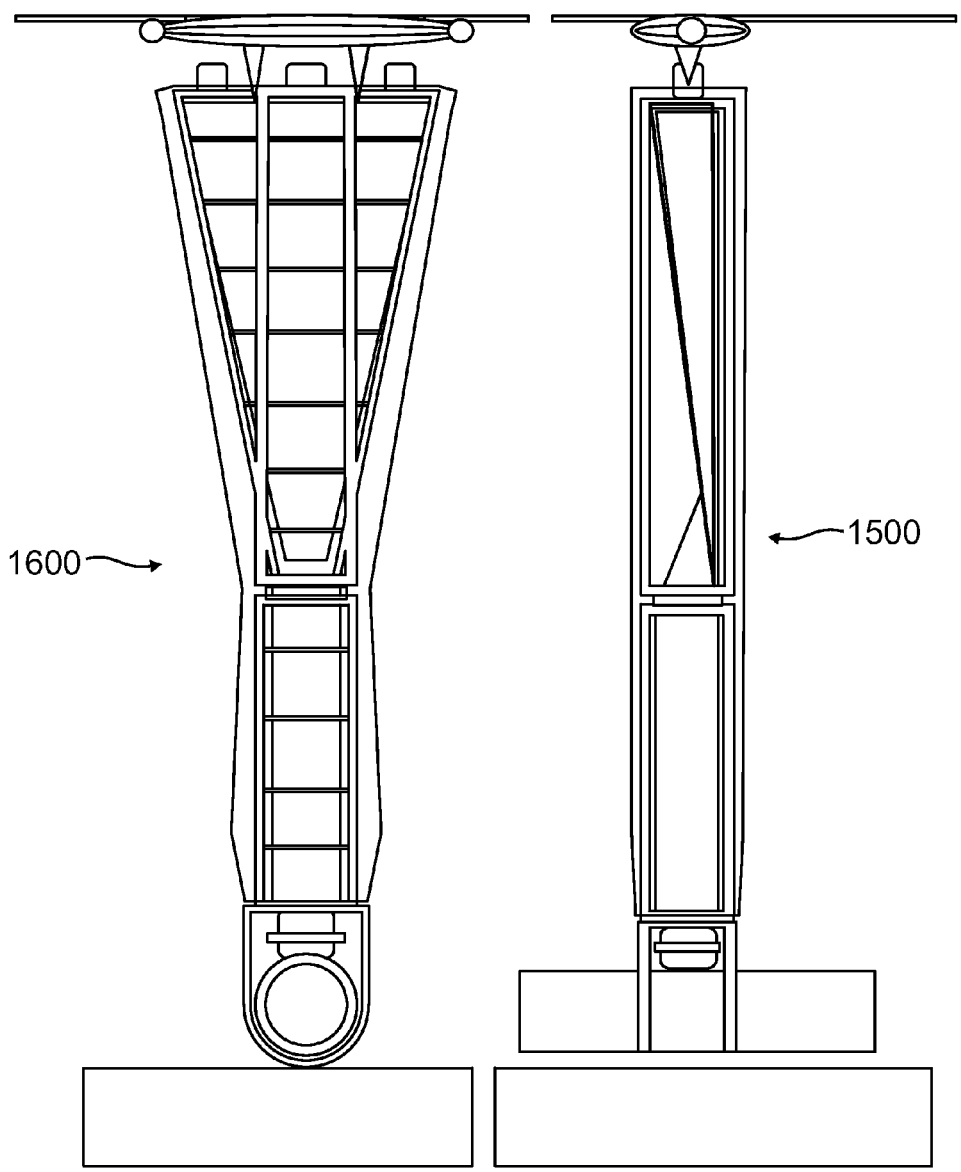
FIG. 18A is a representation of an alternative embodiment for the parallelogram structure that have the structures stacked on top of each other. This would be a view facing the beach or ocean with a single exit valve in any pipe and three smaller intake valves on the top. This shows the structure going from the reef on the bottom to just below the surface of the ocean at high tide. This alternative view constrains the bladder with rods or batons in channels on the surface of the bladder in channels as shown.
FIG. 18B is another representation of an alternative embodiment for the parallelogram structures that have the structures stacked on top of each other. This shows the side view showing the hardware attaching to a pipe and on the top an element extended above the top intake valves to guide water into the valves and also as an element to act to capture the wave energy coming in from offshore.
Figure 19:
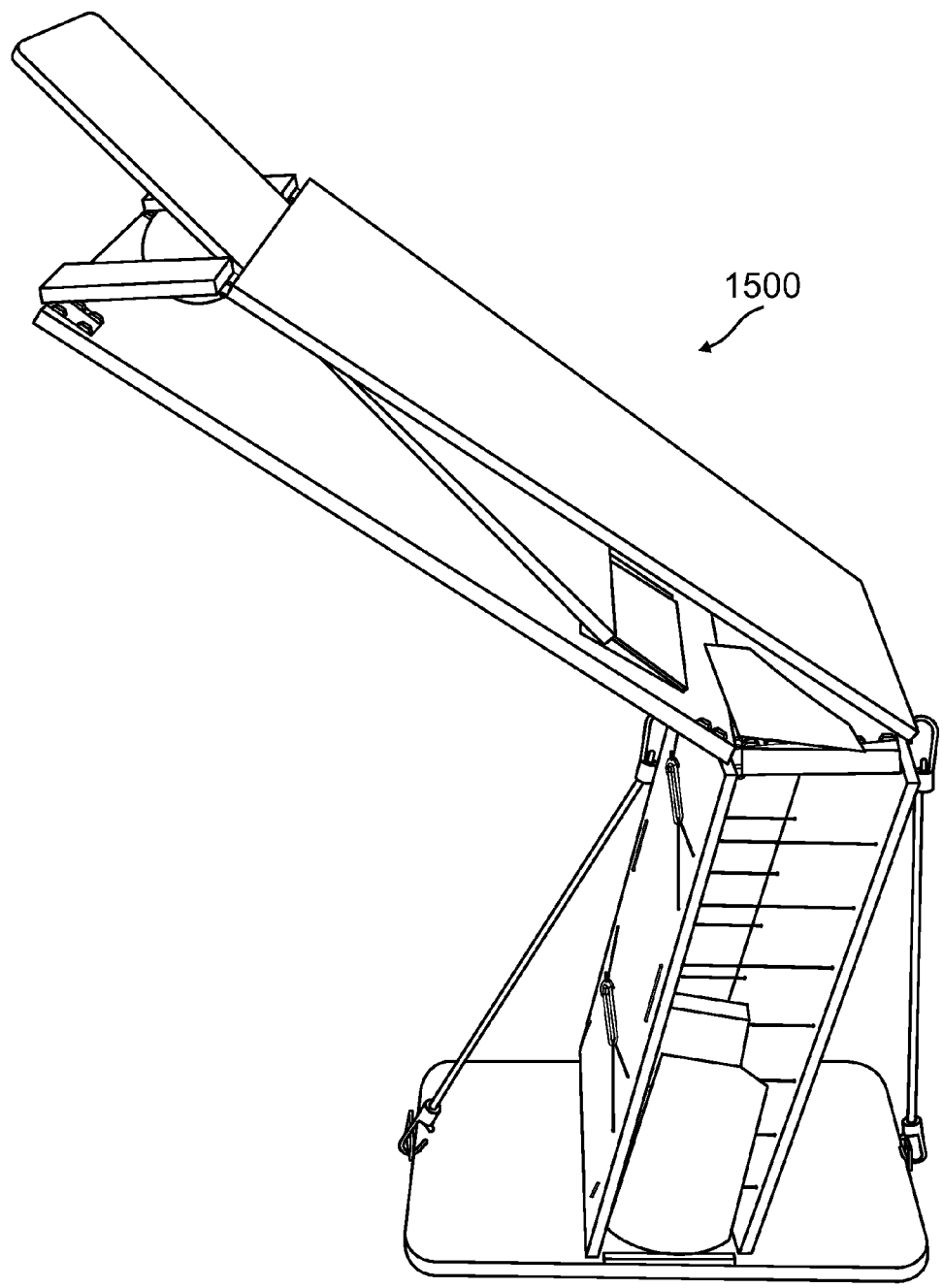
FIG. 19 is a side perspective view of the alternative embodiment rotated after being impacted by a wave. The simple drawing of a wave tank test module illustrates the addition of a signal plane attached and acted on by the motion of the parallelogram. The single plane is attached to one interior compression wall pushing half the water but with more pressure. The bladder is not shown in this drawing.
Figure 20:
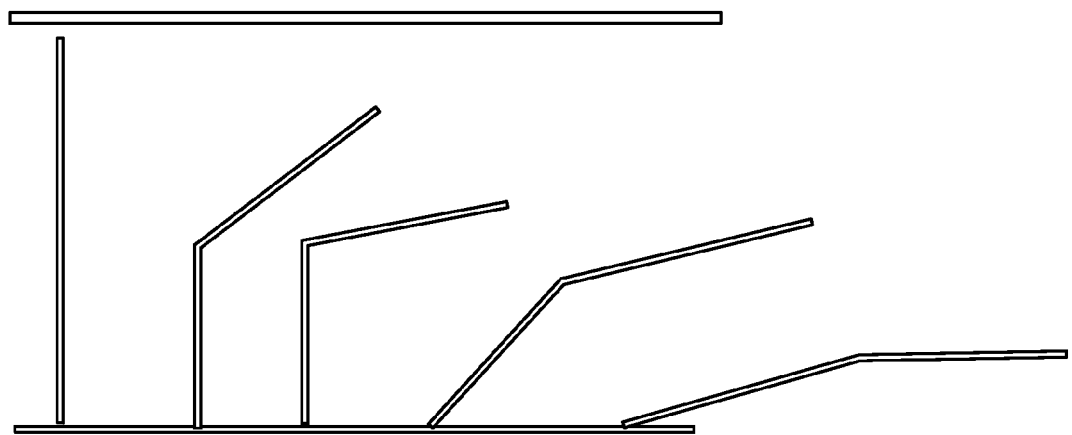
FIG. 20 is a representation of the range of motion of the parallelogram structure at high tide, illustrating the range of motion possible with the double parallelogram structure at high tide.
Figure 21:
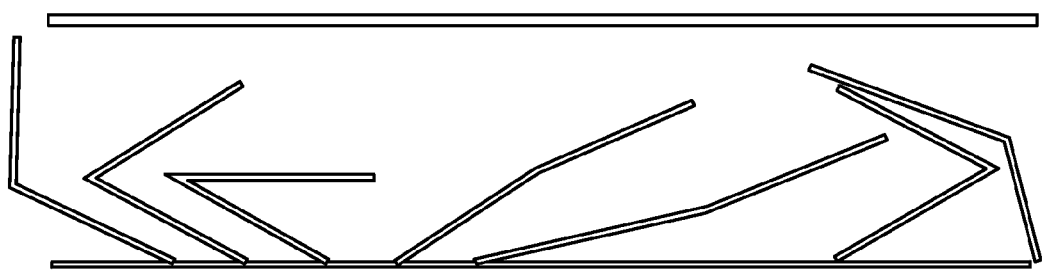
FIG. 21 is a representation of the range of motion of the parallelogram structure at low tide, of the double parallelogram structure at low tide.

Referring to FIGS. 18A, 18B, and 19, it is within the spirit and scope of this invention to have alternative embodiments for the parallelogram structure. FIGS. 18A and 18B show representations of an alternative embodiment of the parallelogram structure with a pivot location just below the vertical midpoint of the structure. FIG. 18A illustrates this embodiment to have a top section that begins to flare at the vertical midpoint and widens to the top to allow three one-way check valves to receive water into the diaphragm. Referring to FIG. 19, an alternative embodiment as represented in FIG. 18B is shown in a rotated condition after being impacted by a wave. Referring to FIGS. 20 and 21, FIG. 20 is a representation of the range of motion of the parallelogram structure at high tide and FIG. 21 is a representation of the range of motion of the parallelogram structure at low tide. These representations show the movement of the parallelogram structure during different tides. The alternative embodiments listed in FIGS. 18A and 18B will have a one diaphragm that, similar to the preferred embodiment, will have one-way check valves at the top and one-way check valves at the bottom.

The present invention is a structural device or parallelogram wave energy collector which converts wave forces from the ocean to the shoreline and the force of the receding wave away from the shoreline. This device is built around a parallelogram frame which interacts directly with the described wave energy to push it or rotate it in the direction of the force, towards or away form the shoreline and floats upward with no force. Inside the structural form are contained two spaced apart compression walls with a diaphragm contained between the two spaced apart compression walls of the parallelogram. The elastomeric diaphragm must have the proper degree of elasticity in its design and typical to be made of polyurethane. Check valves on the top of the diaphragm serve to funnel water into the diaphragm. Check valves on the bottom of the diaphragm enable the water in a compressed diaphragm to exit the diaphragm and into the pipes with head pressure resulting from the diaphragm being compressed. The parallelogram wave energy collector is attached to plumbing and a foundation strongly anchored to the sea floor. It is within the spirit and scope of this invention for a colony of several of these parallelogram wave energy collectors to be affixed to plumbing pipes at spaced apart locations along the pipes. It is also within the spirit and scope of this invention to have an alternate embodiment of parallelogram wave energy collectors that can be positioned vertically on top of each other or stacked on top of each other as shown in FIGS. 18A and 18B. The colony of the parallelogram wave energy collectors is located at various distances from the shoreline, at locations where the wave energy almost breaks and each successive parallelogram wave energy collector adds to the head pressure on the pipes until water exits the pipes and terminates to create a water force on a water turbine on shore. Alternatively to a reservoir or elevated tank as a battery to use the head pressure coming back to a turbine and with the water now going back to the ocean or to be used for some other purpose. Because inshore wave energy is in shallow water, many smaller parallelogram wave energy collector act together to best harvest the energy just off the shore.

It is also within the spirit and scope of this invention to have a secondary parallelogram frame that would attach to the structural reef hardware with a top plate that would be attached to the bottom plate of the parallelogram. Riddled poles can be connected to the side of the top plate of this intermediary parallelogram with floats on the top of these poles. This would allow the parallelogram to function efficiently with the tide. When the tide is lower the floats would lower the parallelogram and when the tide is higher it will move the device higher. This will consistently position the parallelogram into the perfect energy harvesting area. It is known that the highest energy is located just under the surface of the water and this simple idea will utilize this principle.

It is also within the spirit and scope of this invention to include a variation of the diaphragm. If the diaphragm is re-configured in a simple way to keep one side fixed to the one wall and now the other side attached to a structural panel. If this panel is hinged on the bottom in a way that allows the diaphragm to pass though the bottom of it in a way that would still allow water to pass through the bottom of this bladder. With this variation, the force on the structural panel is the same which results in a similar compression of the diaphragm.

This design will eliminate some capacity but the action is more like a classic bellow. The main advantage is the elastomeric bladder will not have to stretch as much as in the preferred embodiment. The bladder takes some of the genetic energy away from the function and so this design allows more energy to compress the diaphragm. The simple one hinge design on the diaphragm allows a more efficient compression and this variation will create more head pressure.

Of course the present invention is not intended to be restricted to any particular form or arrangement, or any specific embodiment, or any specific use, disclosed herein, since the same may be modified in various particulars or relations without departing from the spirit or scope of the claimed invention herein above shown and described of which the apparatus or method shown is intended only for illustration and disclosure of an operative embodiment and not to show all of the various forms or modifications in which this invention might be embodied or operated.

What is claimed is:

1. A wave energy collector (10) used in conjunction with ocean water (3000), an ocean floor (1000), a shoreline (2000) and an on shore water turbine (4000) with blades (4100), the wave energy collector (10) comprising:

a. at least two aligned hollow pipes (21, 23) with a first hollow pipe (21) having an exterior wall (21E) encircling an interior chamber (21I) with a sealed rear end (20F) and an open front end (20) and a second hollow pipe (23) having an exterior wall (23E) encircling an interior chamber (23I) with a sealed rear end (22F) and an open front end (22), a first anchor bar (200) extending transversely across the first hollow pipe (21) and the second hollow pipe (23) and located in proximity to the front end (20-22) of each first (21) and second hollow pipe (23) and a second anchor bar (210) extending transversely across the first hollow pipe (21) and the second hollow pipe (23) and located in proximity to the rear end (20F) and (22F) of each first (21) and second (23) hollow pipe;

b. an upper section (305) having at least a first upper transverse wall (320) and a second upper transverse wall (300), a first upper transverse pipe (34) rotatably supported through the first upper transverse wall (320) and the second upper transverse wall (330), a base wall (298) positioned below said at least two aligned hollow pipes (21, 23), a first lower transverse wall (300) supported by said base wall (298) at a first end of said base wall (298) and extending above said at least two aligned hollow pipes (21, 23) and a second transverse wall (310) supported by said base wall (298) at a second end of said base wall (298) and extending above said at least two aligned hollow pipes (21, 23) and parallel to the first lower transverse wall (300), a first lower transverse pipe (30) rotatably supported through the first transverse wall a (300) and the second transverse wall (310) and a second lower transverse pipe (32) rotatably supported through the first lower transverse wall (300) and the second lower transverse wall (310), a first support pole (40) supported by said first upper transverse pipe (34) and said first lower transverse pipe (30), and a second support pole (44) supported by said first upper transverse pipe (34) and said first lower transverse pipe (30), a third support pole (42) supported by said second upper transverse pipe (36) and said second lower transverse pipe (32), and a fourth support pole (44) supported by said first upper transverse pipe (34) and said second lower transverse pipe (30);

c. a flexible compressible water retaining diaphragm (90) having a boundary wall (91) surrounding an interior chamber (93), a first upper one-way intake valve (121) affixed to the flexible compressible water retaining diaphragm 90, and in fluid communication with said interior chamber (93), a second spaced apart one-way intake valve (122) affixed to the flexible compressible water retaining diaphragm (90), a first one-way check valve (151) extending from an interior of the flexible compressible water retaining diaphragm (90) and in fluid communication with one (21) of said at least two aligned hollow pipes (21, 23), a second one-way check valve (152) extending from said interior chamber (93) of said flexible compressible water retaining diaphragm (90) and in fluid communication with at least a second (23) of the said at least two aligned hollow pipes (21, 23);

d. said flexible compressible diaphragm retained by said first support pole (40) and said second support pole (44) and also retained by said third support pole (42) and said fourth support pole (46), a first transverse plate (82) retained by said first support pole (40) and said second support pole (44) and a second transverse plate (80) retained by said third support pole (42) and said fourth support pole (84), said first transverse plate (82) positioned below said first upper one-way intake valve (121) and said second one-way intake valve (122) and positioned above said first one-way check valve (151) and said second one-way check valve (152) and said second transverse plate (80) positioned below said first upper one-way intake valve (121) and said second one-way intake valve (122) and positioned above said first one-way check valve (150) and said second one-way check valve (152);

e. said flexible compressible water retaining diaphragm (90) positioned between said first transverse plate (82) and said second transverse plate (82), the first transverse plate (80) and the second transverse plate (80) respectively facing an impact of an ocean water (300) wave to protect said flexible compressible water retaining diaphragm (90) from the impact of an ocean water (300) wave; and f. a flexible band (61) retained against a first end (36A) of second upper transverse pipe (36), a first end (34A) of said first upper transverse pipe (34), a second end (34B) of said first upper transverse pipe (34) and a second end (36B) of said second upper transverse pipe (34), and retained at an exterior side of said first lower transverse wall (300) and an exterior side of said second lower transverse wall (302);

g. whereby, the wave energy collector (10) is submerged in ocean water (3000) and retained on the ocean floor (1000) by the first anchor bar 200 and the second anchor bar 210 underneath the at least two aligned hollow pipes, the at least two aligned hollow pipes (21, 23) positioned so that their respective rear ends (20F, 22F) face away from the shoreline (2000) and their respective first ends (20, 22) extend into the shoreline (2000) and terminate adjacent the water turbine (4000) and its blades (4100), ocean water (3000) enters the interior chamber (93) of the flexible compressible diaphragm (90) through the pair of one-way intake valves (121, 122), an incoming wave in the direction of the shoreline (2000) initially hits the second transverse plate (80) which absorbs an impact of the incoming tide wave and also hits said first support pole (40), said second support pole (44), said third support pole (42) and said fourth support pole (46) and the first transverse plate (82) and the second transverse plate (80) which initially were perpendicular to the at least two aligned hollow pipe (21, 23) to rotate in an initial position against the at least two aligned hollow pipes (21, 23) with said flexible band (61) to compress the flexible compressible water retaining diaphragm (90) to force the ocean water (3000) in the interior chamber (93) of the flexible compressible water retaining diaphragm (90) to exit through the lower pair of one-way check exit valves (151, 152) into the at least two aligned hollow pipes (21, 23) and the ocean water (3000) exiting the at least two aligned hollow pipes (21, 23) and impacting the blades (4100) of the water turbine (4000) to cause the water turbine (4000) to generate power, the flexible band (61) causes said first support pole (40), said second support pole (44), said third support pole (42) and said fourth support pole (46) and said first transverse plate (82) and said second transverse plate (80) to return to the initial position perpendicular to the at least two aligned hollow pipes (21, 23) and a tide wave in the direction away from shoreline (2000) initially hits the second transverse plate (80) which absorbs an impact of the exiting tide wave and also hits said first support pole (40), said second support pole (44), said third support pole (42) and said fourth support pole and the first transverse plate (82) and causes them to rotate in an opposite direction against the at least two aligned hollow pipes (21, 23) to fill the interior chamber (93) with ocean water (3000) and then compress the flexible compressible water retaining diaphragm (90) to force the ocean water (3000) in the interior chamber (93) of the flexible compressible diaphragm (90) to exit through the lower pair of one-way exit valves (151, 152) into the at least two aligned hollow pipes (21, 23) and the ocean water (3000) exiting the at least two aligned hollow pipes (21, 23) to exit under force through the first open ends (20, 22) of the at least two aligned hollow pipes (21, 23) and impact the blades (4100) of the water turbine (4000) to cause the water turbine (4000) to generate power, the process repeated as the tide wave moves in the opposite directions.

2. The wave energy collector in accordance with claim 1, further comprising: a ballast (70) with the flexible band (61) also extending through the ballast (70).

3. The wave energy collector in accordance with claim 1, further comprising a multiplicity of spaced apart at least said first support pole 40, said second support pole 44, said third support pole 42 and said fourth support poles (40, 44, 42, 46) and first transverse plate (82) and the second transverse plate (80) positioned along a length of said at least two aligned hollow pipes (21, 23).

* * * * *